United States Patent [19]

Hurd

[11] Patent Number: 4,981,176

[45] Date of Patent: Jan. 1, 1991

[54] METHOD FOR USING FOAMS TO IMPROVE ALKALINE FLOODING OIL RECOVERY

[75] Inventor: Billy G. Hurd, Coppell, Tex.

[73] Assignee: Mobile Oil Corporation, Fairfax, Va.

[21] Appl. No.: 426,925

[22] Filed: Oct. 26, 1989

[51] Int. Cl.$^5$ .................. E21B 33/138; E21B 43/22
[52] U.S. Cl. .................. 166/273; 166/270; 166/294
[58] Field of Search ............ 166/270, 273, 274, 294, 166/309

[56] References Cited

U.S. PATENT DOCUMENTS

| | | |
|---|---|---|
| 3,335,792 | 8/1967 | O'Brien et al. ............ 166/273 |
| 3,491,832 | 1/1970 | Raza ............ 166/273 X |
| 3,927,716 | 12/1975 | Burdyn et al. ............ 166/270 |
| 4,004,638 | 1/1977 | Burdyn et al. ............ 166/273 |
| 4,572,294 | 2/1986 | Duerksen et al. ............ 166/309 X |
| 4,694,906 | 9/1987 | Hutchins et al. ............ 166/273 X |
| 4,706,752 | 11/1987 | Holm ............ 166/273 |
| 4,727,938 | 3/1988 | Lau ............ 166/270 |
| 4,856,588 | 8/1989 | Borchardt ............ 166/309 X |
| 4,856,589 | 8/1989 | Kuhlman et al. ............ 166/274 X |

Primary Examiner—George A. Suchfield
Attorney, Agent, or Firm—Alexander J. McKillop; Charles J. Speciale; Lawrence O. Miller

[57] ABSTRACT

An alkaline flooding oil recovery process is enhanced by injection of aqueous solutions of foam-forming surfactant and gases, or pre-formed foams, either ahead of or behind conventional alkaline slugs. In a preferred embodiment, a slug of an aqueous solution containing an alkaline agent followed by a driving fluid is injected into the formation that displaces oil through the relative high permeability zones of the formation and oil is recovered via the production well. Thereafter, a slug of an aqueous solution of a foam-forming surfactant is coinjected into the formation with a gas creating a foam when the gas mixes with the foam-forming surfactant in the aqueous solution. The foam created from the aqueous surfactant and gas will go preferentially into the formation zones of relatively high permeability and low oil saturation substantially plugging these zones. Thereafter, a slug of an aqueous solution containing an alkaline agent is injected followed by a driving fluid that displaces the aqueous solution containing an alkaline agent and oil through the less permeable zones of the formation toward the production well and oil is recovered from the formation via the production well. This process improves volumetric sweep efficiency and/or reduces effective mobility ratio of released oil and displacing fluids thereby enhancing displacement of oil to the production well and total oil recovery.

2 Claims, No Drawings

METHOD FOR USING FOAMS TO IMPROVE ALKALINE FLOODING OIL RECOVERY

BACKGROUND OF THE INVENTION

This invention relates to the recovery of oil from subterranean oil reservoirs and more particularly to improved alkaline flooding operations involving the injection of aqueous solutions of foam-forming surfactants and gases, or pre-formed foams, either ahead of or behind conventional alkaline slugs.

In the recovery of oil from oil-bearing reservoirs, it is usually possible to recover only minor portions of the original oil in place by the so-called primary recovery methods which utilize only the natural forces present in the reservoir. Thus a variety of supplemental recovery techniques has been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the injected water in order to lower the oil-water interfacial tension and/or to alter the wettability characteristics of the reservoir rock. Also, it has been proposed to add thickening agents to all or part of the injected water in order to increase the viscosity thereof, thus decreasing the mobility ratio between the injected water and oil and improving the sweep efficiency of the waterflood.

The oil-water interfacial tension may be reduced, either by injecting aqueous surfactant solutions into the oil formation, or by forming surfactants in situ. In this regard, crude petroleum is known to contain varying amounts of acid components that upon reaction with alkaline agents form soaps (natural surfactants) in situ that reduce the interfacial tension between the crude petroleum and water. Accordingly, the use of alkaline waterflooding, to form such natural surfactants in situ as a recovery mechanism, has been extensively investigated.

Alkaline flooding improves oil recovery by one or more complex mechanisms, including interfacial tension reduction, emulsification of oil, and alteration of reservoir rock wettability. Interfacial tension reduction increases microscopic oil displacement by reducing the capillary forces which trap oil droplets in reservoir rocks. Emulsification is believed to promote increased oil recovery by entrainment of emulsified oil in carrier waters or by formation of viscous emulsions which tend to be entrapped and divert water to improve volumetric sweep efficiency. Wettability alteration produces changes in oil-water relative permeability characteristics which frequently results in lower residual oil saturations from waterflooding. These mechanisms, which operate to different extents in different reservoirs, are discussed in a review paper by E. H. Meyer et al entitled "Alkaline Waterflooding - Its Theory, Application, and Status", which was published in the Proceedings of the Second European Symposium on Enhanced Oil Recovery, Paris, Nov. 8-10, 1982.

When an oil reservoir is subjected to an alkaline flooding procedure, due to poor mobility or profile control substantial amounts of oil remain behind in the oil formation. Poor mobility control causes the alkaline flood to finger through more viscous oil and around the less permeable relatively oil-rich zones into the formation zones of high permeability and low oil saturation. To improve mobility control and sweep efficiency, expensive water soluble polymers such as xanthan gums or polyacrylamides have been used.

U.S. Pat. No. 3,977,470 to Chang and U.S. Pat. No. 4,004,638 to Burdyn et al discloses recovery of oil from subterranean reservoirs employing an alkaline agent and a sulfonate surfactant.

U.S. Pat. No. 4,773,484 to Chang et al discloses an oil recovery process in which an aqueous solution containing a surfactant is injected with or followed by a gas into a formation to provide enhanced mobility control.

The present invention provides a process for recovering oil from a formation by alkaline flooding with improved mobility and profile control using generally low-cost foam forming injectants that substantially plug the relatively high permeability zones of the formation resulting in increased total oil recovery.

SUMMARY OF THE INVENTION

My invention involves an improved alkaline flood oil recovery process for recovering oil from an oil-containing formation having at least one relatively high permeability zone and at least one relatively low permeability zone, the formation being penetrated by at least one injection well and at least one spaced apart production well in fluid communication with a substantial portion of the formation. In a preferred embodiment of the invention, a slug of an aqueous solution containing an alkaline agent is injected into the formation via the injection well that preferentially enters the relatively high permeability zones followed by injecting a driving fluid that displaces the aqueous alkaline solution and oil through the higher permeability zones of the formation and oil is recovered via the production well. The amount of aqueous solution containing an alkaline agent injected is in the range of 0.05 to 0.5 pore volume and the concentration of alkaline agent is 0.1 to 2 weight percent. Thereafter, a slug of aqueous solution containing a foam-forming surfactant and gas are coinjected into the formation via the injection well in an amount within the range of 0.05 to 0.5 pore volume creating a foam when the gas mixes with the foam-forming surfactant in the aqueous solution. The concentration of foam-forming surfactant in the aqueous solution is within the range of 0.1 to 1.0 weight percent. The foam created by coinjection of the aqueous surfactant solution and gas will go preferentially into the formation zones of relatively high permeability and low oil saturation substantially plugging these zones. Thereafter, a slug of an aqueous solution containing an alkaline agent is injected into the formation via the injection well followed by a driving fluid that displaces the aqueous alkaline solution and oil through less permeable zones of the formation saturated with oil toward the production well and oil is recovered from the formation via the production well. In another embodiment, the foam may be formed in-situ in the formation by sequentially injecting an aqueous solution containing a foam-forming surfactant followed by gas. If desired, the sequential injection of slugs of aqueous surfactant solution and gas followed by a slug of aqueous alkaline solution may be repeated for a plurality of cycles prior to injection of the final driving fluid.

DESCRIPTION OF PREFERRED EMBODIMENTS

The present invention provides an improved alkaline flooding process for recovering oil from an oil-containing subterranean formation having at least one relatively high permeability zone and at least one relatively low permeability zone, the formation being penetrated by at least one injection well and a spaced-apart production well in fluid communication with a substantial portion of the formation through perforations. In a preferred embodiment, a first slug of aqueous solution containing an alkaline agent is injected into the formation via the injection well that preferentially enters the relatively high permeability zones of the formation. The amount of aqueous solution containing an alkaline agent injected is in the range of 0.05 to 0.5 pore volume. The concentration of alkaline agent is within the range of 0.1 to 2 weight percent. Thereafter, a driving fluid is injected into the formation via the injection well that displaces the aqueous alkaline solution and oil through the relatively high permeability zones of the formation toward the production well and oil is recovered from the formation via the production well until the amount of oil recovered is unfavorable. Thereafter, a slug of an aqueous solution containing a foam-forming surfactant is coinjected with gas into the formation via the injection well, creating a foam when the gas mixes with the foam-forming surfactant in the aqueous solution. The pre-formed foam created by the foam-forming aqueous surfactant solution and gas will go preferentially into the formation zones of relatively high permeability substantially plugging these zones. The amount of the aqueous solution containing a foam-forming surfactant injected is in the range of 0.05 to 0.5 pore volume. The concentration of surfactant in the aqueous solution is within the range 0.1 to 1.0 weight percent. The amount of gas coinjected with the aqueous solution is such that the mixture of aqueous solution and gas contains about 70 to 90 volume percent gas measured at reservoir conditions of temperature and pressure. Low cost gases commonly used in enhanced oil recovery (EOR) processes may be used in the present process. Preferably, the gas is selected from the group consisting of air, nitrogen, methane, natural gas, flue-gases, $CO_2$ or mixtures thereof.

After injection of the slug of aqueous solution containing a foam-forming surfactant coinjected with the gas, a second slug of an aqueous solution containing an alkaline agent is injected into the formation via the injection well. The amount of aqueous solution containing an alkaline agent injected is in the range of 0.05 to 0.5 pore volume and the concentration of alkaline agent is within the range of 0.1 to 2 weight percent. Thereafter, a driving fluid is injected into the formation via the injection well to displace the aqueous solution containing an alkaline agent and oil through the less permeable relatively oil-rich formation zones of the formation toward the production well and oil is recovered from the formation via the production well. This process improves volumetric sweep efficiently and/or reduces effective mobility ratio of released oil and displacing fluids thereby enhancing displacement of oil to the production well and total oil recovery. In another variation of this embodiment, alternating slugs of coinjected aqueous surfactant solution and gas followed by a slug of aqueous alkaline solution may be injected for a plurality of cycles before injecting the final drive fluid.

Driving fluids for use in my invention may be gaseous or liquid. For example, gases such as air, natural gas, flue gases, nitrogen or mixtures thereof may be used as drive fluids for the process of my invention. Aqueous fluids such as water or oil field brines are particularly preferred driving fluids for the process. It may be desirable in some applications to add a water soluble polymer, such as xanthan gum polysaccharides or synthetic polyacrylamides as frequently employed in polymer flooding oil recovery processes, to the final aqueous drive fluid. If used, the polymer would be added in concentrations from 100 to 2000 ppm by weight.

The foam-forming surfactant employed in the aqueous solution may be any surfactant which produces a stable foam when its aqueous solution is mixed with gases under reservoir temperature, pressure and salinity conditions. Preferred surfactants include alkyl or alkylaryl sulfonates, alkyl glycerol sulfonates, alkylether sulfates or sulfonates, or alkyl diphenylether sulfonates. A suitable commercial sulfonate is available from GAF Corporation identified as Alipal CD-128. The most effective foam-forming surfactant for a particular application would depend on reservoir conditions of application, especially salinity, temperature, reservoir rock type, and crude oil composition.

The alkaline agents employed in the aqueous solution include sodium carbonate or bicarbonate, sodium or ammonium hydroxide and sodium orthosilicate or mixtures thereof.

In another embodiment of the invention, the foam may be formed in-situ in the formation. In this embodiment, after the first slug of aqueous solution containing an alkaline agent is injected followed by a driving fluid to recover oil from the relatively high permeability zones of the formation, a slug of an aqueous solution of a foam-forming surfactant is injected into the formation via the injection well in an amount in the range of 0.05 to 0.5 pore volume. The concentration of surfactant is within the range of 0.1 to 1.0 weight percent. Thereafter a gas is injected into the formation via the injection well in an amount from one half up to four times the volume of the aqueous surfactant solution measured at formation conditions of temperature and pressure. The injected gas fingers through the aqueous solution and generates a foam in-situ with the foam-forming surfactant in the aqueous solution. The foam formed in-situ is generated preferentially in the formation zones of relatively high permeability and low oil saturation, substantially plugging these zones. Thereafter, a second slug of an aqueous solution containing an alkaline agent is injected followed by a driving fluid that displaces the aqueous alkaline solution and oil through the less permeable zones of the formation saturated with oil toward the production well and recovering oil from the formation via the production well. Another variation of this embodiment would be to inject the slug of an aqueous solution containing a foam-forming surfactant followed by a slug of gas followed by a slug of aqueous alkaline solution for a plurality of cycles prior to injecting the final drive fluid. The amount of alternate slugs of aqueous surfactant solution, gas, and aqueous alkaline solution may vary within the range of 0.05 to 0.5 pore volumes measured at formation condition of temperature and pressure.

In another embodiment of the invention, if desired, recovery of oil from the relatively high permeability zones by initially injecting a slug of aqueous alkaline solution followed by a driving fluid may be omitted. In this embodiment, the first step of the process would consist of plugging the relatively high permeability zones with pre-formed foam or in-situ foam.

The present invention may be carried out utilizing injection and production systems as defined by any suitable arrangement of wells. One well arrangement commonly used in waterflooding operations and suitable for use in carrying out the present invention is an inverted five-spot pattern of the type illustrated in U.S. Pat. No. 3,927,716 to Burdyn et al, the disclosure of which is hereby incorporated by reference. Other well arrangements may be used in carrying out the present invention, examples of which are set forth in the Burdyn et al patent. By the term "pore volume" as used herein, it is meant that volume of the portion of the formation underlying the well pattern employed, as described in greater detail in the Burdyn et al patent.

I claim:

1. A method for the recovery of oil from a subterranean, oil-containing formation having at least one relatively high permeability zone and at least one relatively low permeability zone, the formation penetrated by at least one injection well and at least one spaced apart production well in fluid communication with a substantial portion of the formation, the method comprising:
    (a) injecting a slug of an aqueous solution containing an alkaline agent into the formation via the injection well that preferentially enters the relatively high permeability zones of the formation;
    (b) injecting a driving fluid into the formation via the injection well that displaces the aqueous solution containing the alkaline agent and oil through the relatively high permeability zones of the formation and recovering oil from the formation via the production well;
    (c) coinjecting a slug of a gas and aqueous solution of foam-forming surfactant selected from the group consisting of alkyl or alkylaryl sulfonates, alpha or internal olefin sulfonates, alkyl glycerol sulfonates, and alkyl diphenylether sulfonates, or alkylether sulfates or sulfonates into the formation via the injection well that creates a foam when the gas mixes with the aqueous form-forming surfactant, which substantially plugs the relatively high permeability zones of the formation;
    (d) injecting a slug of an aqueous solution containing an alkaline agent into the formation via the injection well; and
    (e) thereafter injecting a driving fluid into the formation via the injection well that displaces the aqueous alkaline solution and oil through the relatively low permeability zones of the formation toward the production well and recovering oil from the formation via the production well.

2. A method for the recovery of oil from a subterranean, oil-containing formation having at least one relatively high permeability zone and at least one relatively low permeability zone, the formation penetrated by at least one injection well and at least one spaced apart production well in fluid communication with a substantial portion of the formation, the method comprising:
    (a) injecting a slug of an aqueous solution containing an alkaline agent into the formation via the injection well that preferentially enters the relatively high permeability zones of the formation;
    (b) injecting a driving fluid into the formation via the injection well that displaces the aqueous solution containing the alkaline agent and oil through the relatively high permeability zones of the formation and recovering oil from the formation via the production well;
    (c) injecting a slug of an aqueous solution of foam-forming surfactant is selected from the group consisting of alkyl or alkylaryl sulfonates, alpha or internal olefin sulfonates, alkyl glycerol sulfonates, and alkyl diphenylether sulfonates, or alkylether sulfates or sulfonates into the formation via the injection well that preferentially enters the relative high permeability zones of the formation;
    (d) injecting a slug of a gas into the formation via the injection well that preferentially enters the relative high permeability zones of the formation and creates a foam when the gas mixes with the aqueous form-forming surfactant, said foam substantially plugging the relatively high permeability zones for the formation;

* * * * *

UNITED STATES PATENT AND TRADEMARK OFFICE
CERTIFICATE OF CORRECTION

PATENT NO. : 4,981,176

DATED : January 1, 1991

INVENTOR(S) : Billy G. Hurd

It is certified that error appears in the above-identified patent and that said Letters Patent is hereby corrected as shown below:

Column 6, line 46, after "formation;" add --(e) injecting a slug of an aqueous solution containing an alkaline agent into te formation via the injection well; and
(f) thereafter injecting into the formation via the injection well a driving fluid that displaces the aqueous solution containing an alkaline agent and oil through the relatively low permeability zones and recovering oil from the formation via the production well.--

Signed and Sealed this

Ninth Day of June, 1992

*Attest:*

DOUGLAS B. COMER

*Attesting Officer*    *Acting Commissioner of Patents and Trademarks*